United States Patent Office

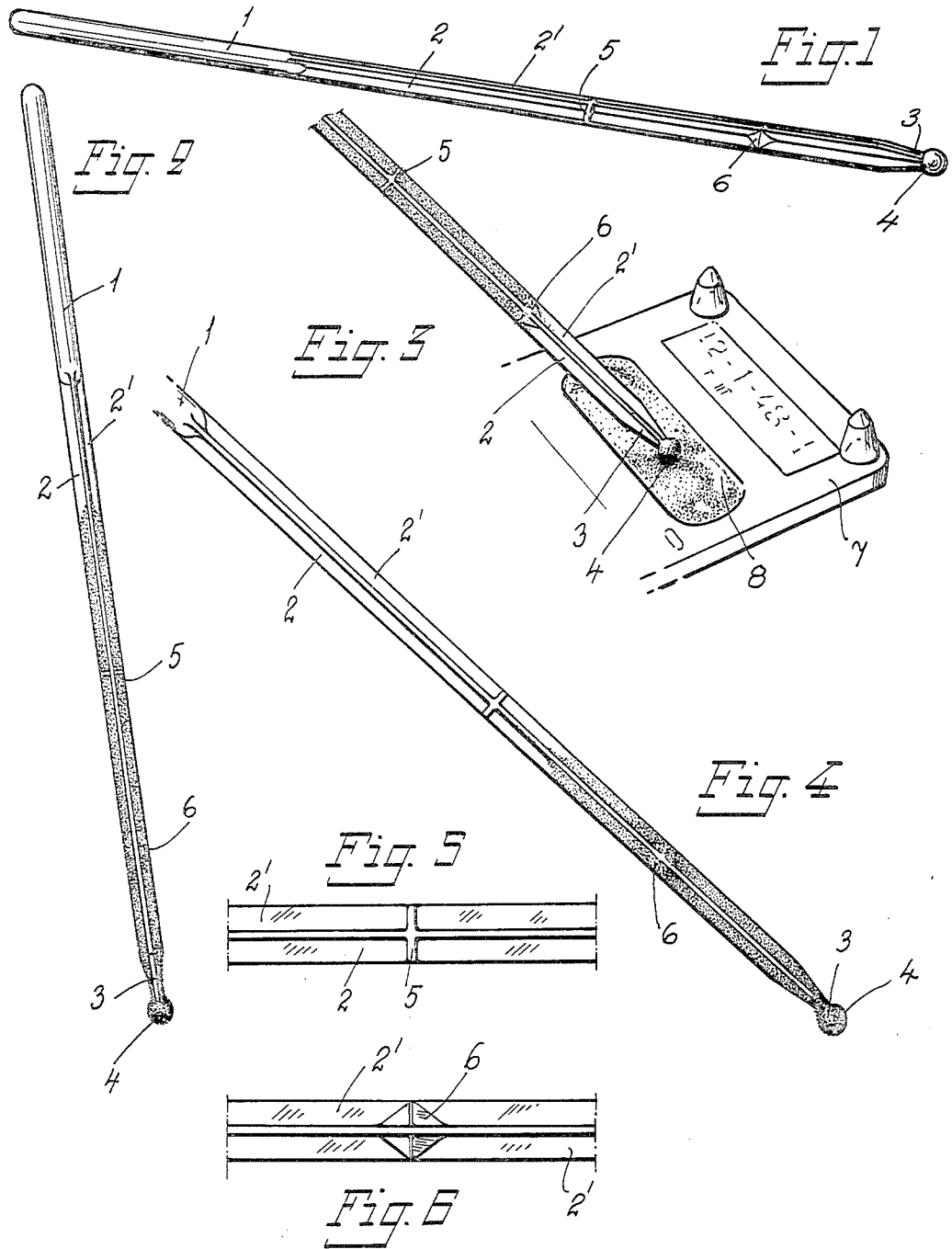

3,479,881
Patented Nov. 25, 1969

3,479,881
MEASURING ROD
Hans Peter Olof Unger, Skeppargatan 57,
Stockholm, Sweden
Filed Sept. 20, 1967, Ser. No. 669,092
Claims priority, application Sweden, Sept. 22, 1966,
12,379/66
Int. Cl. G01n 1/10; B43m 11/00; G01f 11/10
U.S. Cl. 73—425.4                 4 Claims

ABSTRACT OF THE DISCLOSURE

A measuring rod for measuring liquids whose tapered one end is provided with a bulbous portion, the rod being adapted to be immersed in the liquid, and having a number of parallel flutes which are defined by longitudinal ribs between which are located transversely extending threshold members, which threshold members constitute delay means for the passage of the fluid towards the tapered portion.

---

The present invention relates to a measuring rod, that is to say a means for metering liquid substances such as fluids and the like.

Measuring rods for this purpose are previously known and are used preferably for laboratory work, particularly in hospitals in connection with blood analysis and the analysis of other body fluids.

The prior art measuring or dispensing rods are usually unsuitable for use, for instance, when extracting blood tests, which are arranged in recesses in inspection plates and the like. The rods are usually cylindrical in shape, whereby the extraction fluid, in amounts difficult to control, is caused to drop or run down into the recesses.

Consequently, there has long been a demand for a measuring rod, by means of which the amount of departing extraction fluid can always be determined and controlled.

The measuring rod according to the present invention fulfills this requirement in a very simple and effective manner, besides which the rod is intended to be used once only, so that such processes as washing and sterilizing are rendered unnecessary.

The measuring rod according to the invention comprises an elongated rod which is tapered at one end and at which end is provided with a bulbous shaped portion; the rod being adapted to be partially manually immersed in a liquid, of which some adheres to the surface of the rod and flows along the same, over the pointed and bulbous portion, to then be deposited continuously onto a material surface or substance; the said rod being mainly characterized by the combination that in its longitudinal extension it presents a number of parallel extending flutes which are defined by transversely extending threshold members arranged annularly in the same plane around the rod at suitable distances apart; the said threshold members constituting delay means for the passage of the liquid towards the tapered portion of the rod and measuring means for the quantity of fluid applied to the flutes of said rod.

The measuring rod is further characterized in that the surfaces of the flutes present transversely extending ridges or other raised portions, besides which the surfaces of the flutes, the threshold members and the bulbous portion are hydrophilic.

Another characteristic feature of the invention is that at least one threshold in each flute presents two surfaces inclined obliquely towards one another.

An embodiment of a measuring rod according to the invention will now be described in detail with reference to the accompanying drawing.

FIGURE 1 is a perspective view of the rod according to the invention.

FIGURE 2 shows the same view of the rod filled with extraction fluid.

FIGURE 3 shows a view of a rod and an inspection plate, where a portion of the fluid, at the lower end of the rod, is caused to flow into a recess containing blood, in the plate.

FIGURE 4 shows a view of the rod, where the lower portion of the rod is filled with liquid from the upper portion of the rod.

FIGURE 5 shows in an enlarged scale a portion of the rod including an upper threshold member.

FIGURE 6 shows a portion of the rod including a lower threshold member, in the same scale.

The reference numeral 1 in the drawing indicates the body of the rod, the body being made entirely of transparent synthetic plastic material, if desired. The rod presents a number of longitudinally extending ribs that define parallel flutes 2 and 2' between them, which terminate in a conical point 3 at the one end portion of the rod, the said end portion presenting a bulbous portion 4.

Each flute 2 or 2' is provided with two threshold members 5 and 6 of which the upper 5 presents surfaces which extend at right angles to the long direction of the rod, whilst the lower 6 presents surfaces which are inclined obliquely towards one another. The portion of the rod provided with flutes 2, 2', point 3, bulb 4 and threshold members 5 and 6 is treated with a substance which causes the surface to become hydrophilic, besides which the flutes 2, 2' are provided with transversely extending raised portions, such as ridges.

Also shown is an inspection plate 7, which is provided with a number of recesses 8, in which blood or another fluid is intended to be deposited.

The measuring rod according to the invention functions and is used in the following manner.

The rod is immersed in a known manner in a fluid, which thus fills the flutes 2, 2'. When extracting the rod, it is held substantially vertically (FIGURE 2). As soon as the bulb 4 comes into contact with the fluid (the blood) in the recess 8 (FIGURE 3) the fluid located under the lower threshold member 6 of the rod runs off, the said threshold member forming a temporary dam means for the fluid located further up the rod, so that the said fluid is prevented from flowing immediately down towards the bulb 4. When effecting the next extraction operation (FIGURE 4) a portion of the remaining fluid has run down toward the bulb 4, and the same amount of fluid thus runs rapidly away. Upon a further extraction operation the fluid previously located between the threshold members 5 and 6 has run down towards the bulb 4 and departs in the same amount; the lower threshold member 6 serving as a fluid break. When the upper threshold member 5 is provided with surfaces which extend transversely to the longitudinal direction of the rod, it serves as a break means which prevents the fluid from running down the rod more effectively than the lower threshold member 6, whereby measurement of the fluid dispensed is automatically effected. It is of small importance how far the rod is immersed into the fluid intended to fill the flutes 2, 2', since the fluid is always dispensed in measured quantities at each extraction.

The design, number and spacing of the threshold members can be suitably determined according to the purpose for which the rod is intended.

The measuring rod according to the invention is suited for mass production and is thus inexpensive to produce, which is one condition for such disposable items.

What I claim is:
1. A means for measuring liquid substances, comprised of an elongated rod which is tapered at one end and at which has a bulbous portion; the rod being adapted to be partially immersed manually in a liquid, of which some adheres to the surface of the rod and flows along the same, over the pointed and bulbous portion, to then be deposited continuously onto a material surface or substance; characterized by the combination that the rod presents in its longitudinal direction a number of parallel extending flutes which are defined by longitudinal ribs between which are located transversely extending threshold members arranged annularly in the same plane around the rod at suitable distances apart; the said threshold members constituting delay means for the passage of the fluid towards the tapered portion of the rod, and measuring means for the quantity of fluid applied to the flutes of said rod.

2. A means according to claim 1, characterized in that the surfaces of the flutes terminate in transversely extending raised portions.

3. A means according to claim 1 or 2, characterized in that the surfaces of the flutes, the threshold members and the bulb portion are hydrophilic.

4. A means according to claim 1, characterized in that at least one threshold member in each flute has two surfaces inclined obliquely towards one another.

References Cited

UNITED STATES PATENTS

| | | | |
|---|---|---|---|
| 11,421 | 8/1854 | Glorer | 15—445 |
| 169,109 | 9/1875 | Sawyer | 401—128 |
| 2,430,023 | 11/1947 | Longmaid | 15—446 X |
| 3,040,937 | 6/1962 | Lantery | 22—356 X |

FOREIGN PATENTS 324,806    9/1920    Germany.

S. CLEMENT SWISHER, Primary Examiner

U.S. Cl. X.R.

222—356; 401—128